United States Patent
Turner

[15] 3,643,454
[45] Feb. 22, 1972

[54] WATER SYSTEM FOR AN ICEMAKING APPARATUS

[72] Inventor: Phillip H. Turner, Inver Grove Heights, Minn.

[73] Assignee: Whirlpool Corporation, Benton Harbor, Mich.

[22] Filed: May 22, 1970

[21] Appl. No.: 39,774

[52] U.S. Cl. ........................................62/66, 62/348, 62/354
[51] Int. Cl. ...........................................................F25c 1/14
[58] Field of Search ................................62/67, 354, 348, 66

[56] References Cited

UNITED STATES PATENTS

| | | | |
|---|---|---|---|
| 2,656,689 | 10/1953 | Muffly | 62/348 X |
| 2,982,113 | 5/1963 | Pichler | 62/348 X |

FOREIGN PATENTS OR APPLICATIONS

| | | | |
|---|---|---|---|
| 409,499 | 5/1934 | Great Britain | 62/354 |
| 603,061 | 9/1934 | Germany | 62/354 |

*Primary Examiner*—William E. Wayner
*Attorney*—James S. Nettleton, Thomas E. Turcotte, Burton H. Baker, Donald W. Thomas, Gene A. Heth, Franklin C. Harter, Anthony Niewyk, Robert L. Judd and Hill, Sherman, Meroni, Gross & Simpson

[57] ABSTRACT

A method and means for producing ice by gravitationally feeding water from a source of supply in excess of the freezing capacity of a refrigerated cylinder, wherein the feed water is directed into a lower part of the cylinder and the excess feed water is vented through a drain located in a compression nozzle above the level of the cylinder. The water is circulated through openings formed in the top of a harvesting auger. The water flow aids in lifting harvested ice product and also serves to thaw out the unit and prevent it from becoming ice bound.

9 Claims, 5 Drawing Figures

INVENTOR
PHILLIP H. TURNER
BY Hill, Sherman, Meroni, Gross & Simpson
ATTORNEYS

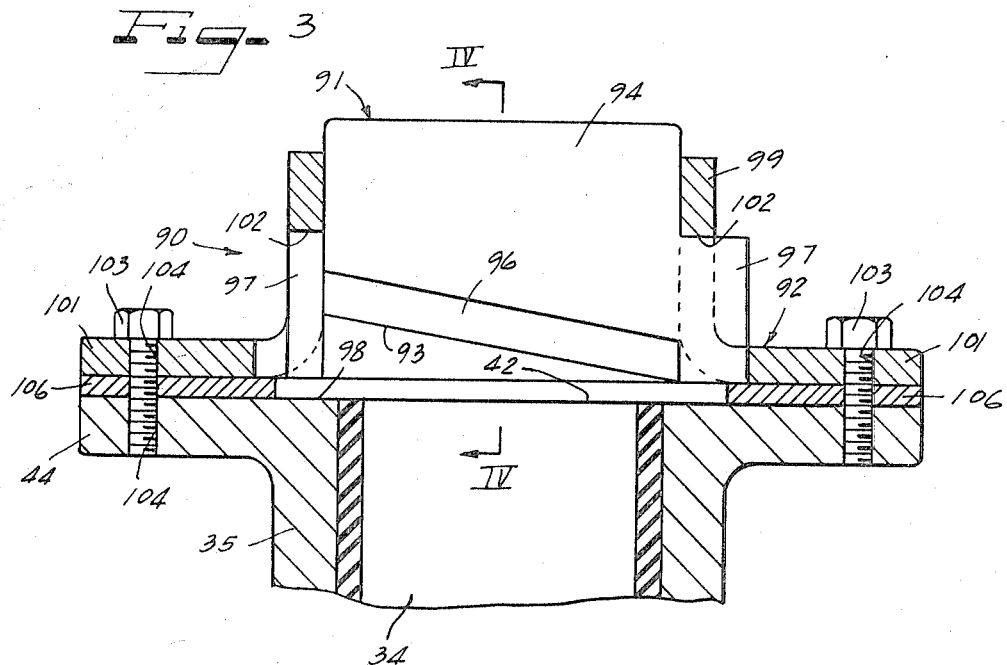
Fig. 3
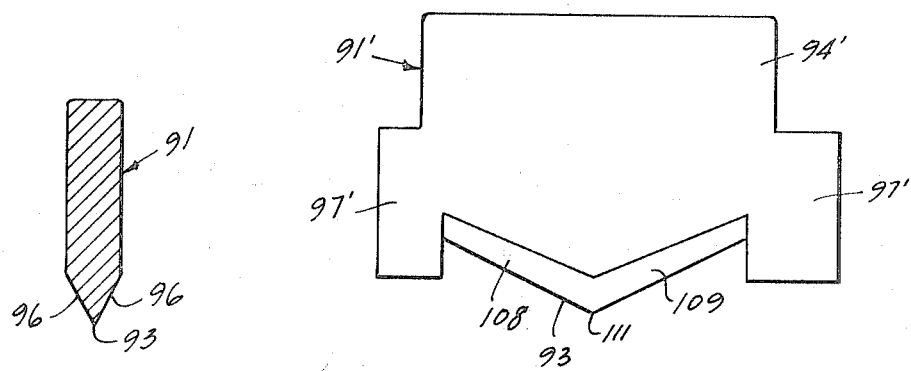
Fig. 4
Fig. 5
INVENTOR
PHILLIP H. TURNER

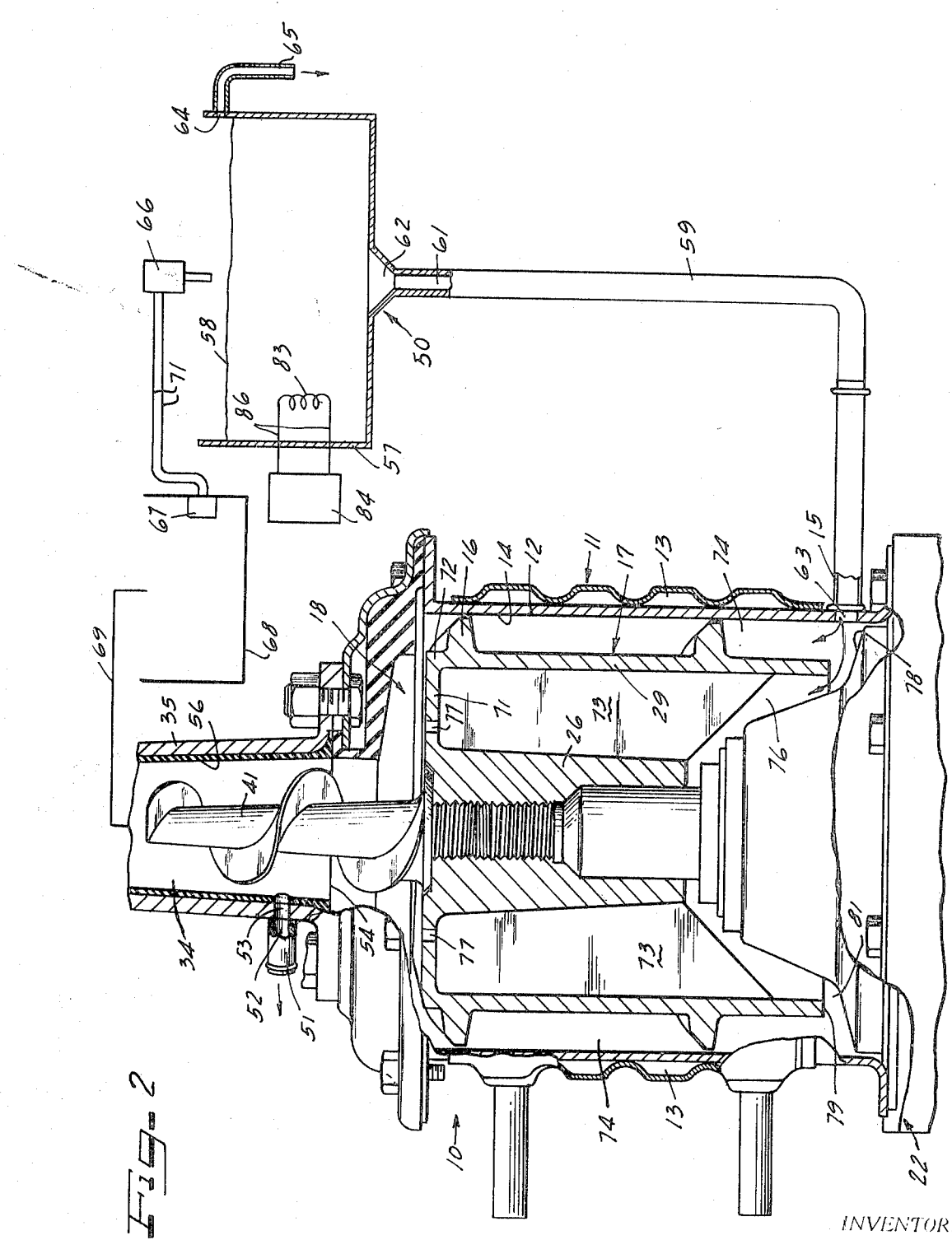

WATER SYSTEM FOR AN ICEMAKING APPARATUS

BACKGROUND OF THE INVENTION

1. Field of the Invention

The present invention relates generally to ice makers and more particularly refers to a method and means for producing an impurity-free finished ice product from a water source and means for producing a cracked ice product from a hard ice column.

2. Description of the Prior Art

In one form of ice maker, heretofore provided, finished ice products are produced by continuously harvesting and compressing ice flakes or slush formed on a refrigerated cylinder wall of a freezing chamber provided by an upright, tubular member having an internal bore surface sized to cooperate with helical flights of a rotatable harvesting auger disposed in close proximity thereto.

The state of the art is exemplified by the copending Pat. application, Ser. No. 867,248, filed Oct. 17, 1969 and assigned to the same assignee as this application.

In that disclosure, a pump-driven stream is circulated through a water system utilizing a reservoir and overflow means.

SUMMARY OF THE INVENTION

An ice-making apparatus produces a finished ice product from ice flakes or slush formed in a freezing chamber by collecting the ice flakes or slush in a collection chamber and forcing the ice product through a tapered nozzle bore to compress the same into a hard, finished ice product. A water system, constructed in accordance with the present invention, gravitationally feeds water supplied from a domestic source through the freezing chamber in an amount in excess of the freezing capacity of the freezing cylinder. In such a manner, a portion of the water freezes into ice in the freezing chamber while another portion of the supplied water remains in a liquid state for receiving minerals and other impurities migrating from the freezing water. The liquid, impurity-laden portion of the supply water and excess water, removed from the ice flakes or slush as the same is forced through the tapered nozzle, drain from the ice making apparatus through a drain passageway intersecting the tapered nozzle, thereby to discard the impurities received in the liquid portion of the supply water and form a finished ice product from substantially impurity-free water.

In order to gravitationally feed the supply water upwardly through the freezing chamber, the water system includes a tank for containing a pool of water and means for maintaining a liquid level within the tank at a height above a location of the drain passageway intersecting the tapered bore. Conduit means form a passageway interconnecting the tank with an inlet port near a lower end of the freezing chamber. The conduit passageway is sized relative to a height of the liquid level normally maintained in the tank so that the flow of water gravitationally fed through the freezing chamber is in an amount in excess of the freezing capacity of the ice maker.

Selectively operable valve means receiving water from a source of supply direct a controlled flow of water to the tank in response to a sensed demand for the finished ice product.

In the event the ice-making apparatus becomes ice bound by an accumulation of ice flakes or particles in the freezing chamber, collection chamber or tapered nozzle bore, heating means in the water supply system are actuated to supply heated water to the ice-making apparatus.

Water flows through the freezing chamber and through passageways formed through a rotatable harvesting auger, disposed in the freezing chamber and cooperating with a refrigerated freezing surface for breaking a film of ice formed thereon. The passageways in the harvesting auger direct the water to the collection chamber and tapered nozzle, thereby insuring flow of the water beyond the freezing chamber in the event the freezing chamber is clogged by an accumulation of ice.

If desired, the finished ice product may be in the form of cracked ice produced by impacting a compressed column of hard ice emerging from the tapered bore against knife means extending transversely across the tapered bore and having a downwardly projecting knife edge.

BRIEF DESCRIPTION OF THE DRAWINGS

FIG. 2 is a partial, sectional view of the ice-making apparatus of FIG. 1 with the water system of the present invention diagrammatically illustrated;

FIG. 3 is an enlarged, partial sectional view of the ice maker shown in FIG. 1 and illustrates knife means, constructed in accordance with the present invention, for forming a cracked ice product from an emerging hard ice column;

FIG. 4 is a sectional view taken substantially along line IV—IV of FIG. 3; and

FIG. 5 is an elevational view illustrating an alternative configuration of a knife blade utilized in the knife means shown in FIGS. 3 and 4.

DETAILED DESCRIPTION OF THE PREFERRED EMBODIMENTS

Figure 1:
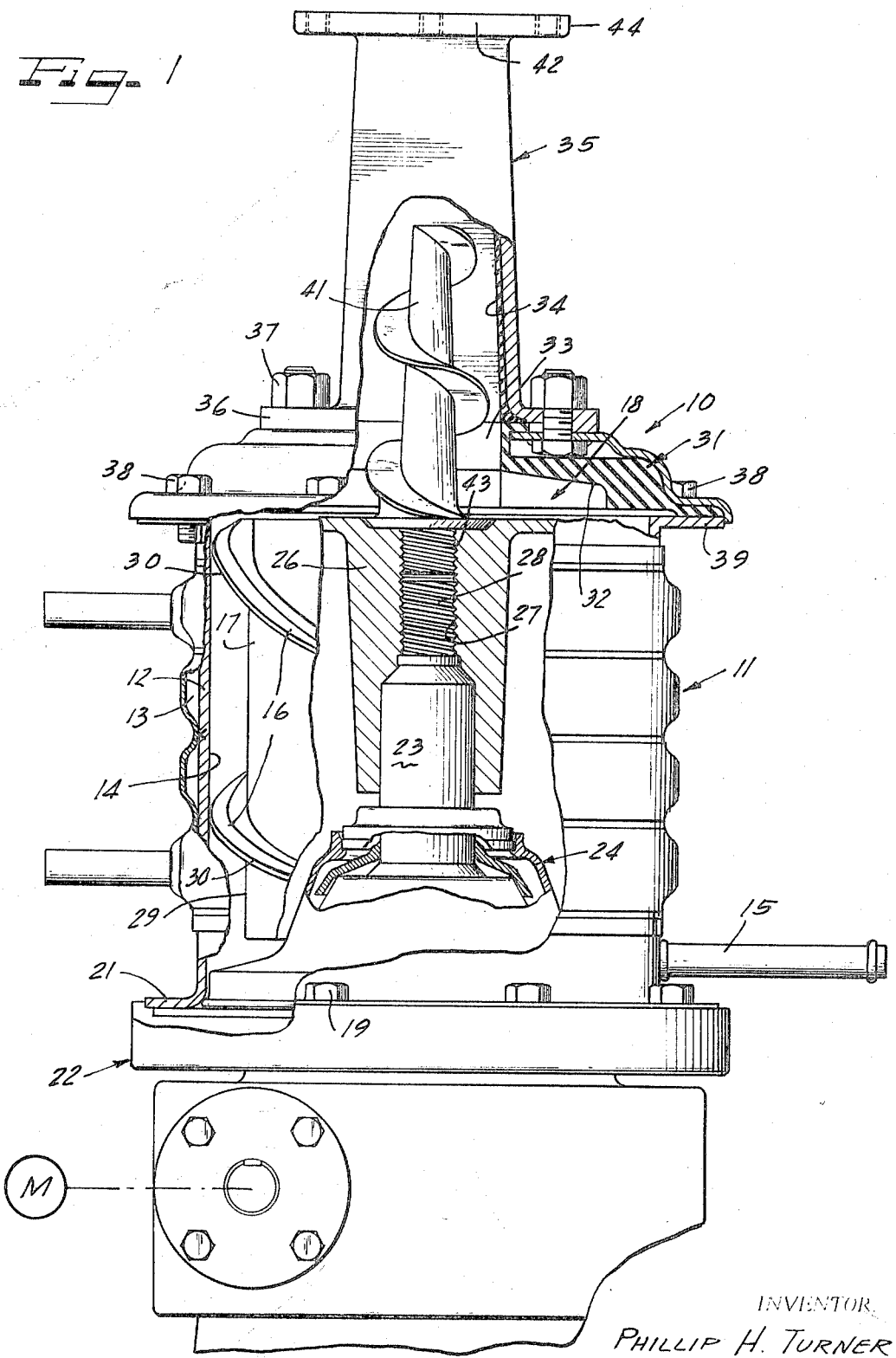
FIG. 1 is an elevational view with portions broken away to illustrate additional details of an ice making apparatus utilizing a water system constructed in accordance with the principles of the present invention.

Referring to the drawings, an ice maker of the present invention is shown generally at 10 and includes an evaporator unit 11 having an internal bore forming a cylindrical wall 12. An integrally formed evaporator passageway 13 has a refrigerant or coolant expanded thereinto by a refrigeration system through an expansion valve or other pressure-reducing means. Water is introduced into the evaporator internally of the wall 12 through an inlet conduit 15 disposed near a base of the unit 11. The water tends to freeze on the wall 12 in the form of a thin film of ice. One or more helical flights 16 formed or carried on a rotating harvesting auger 17 cooperate with the wall 12, which, in effect, forms a freezing surface 14, whereby films of ice formed on the freezing surface 14 will be continuously harvested. The auger 17 progressively advances the harvested ice flakes or particle upwardly in the unit 11 towards a collection chamber 18 superjacent the evaporator unit 11.

Suitable fastening means, such as bolts 19, attach a radially outwardly extending flange 21 formed on the evaporator unit 11 to a drive housing 22. A shaft 23 is disposed centrally of the evaporator unit 11 and has a lower end portion supported within axially spaced bearing means in the drive housing 22. Gear reduction means are driven by a prime mover such as an electric motor M. The shaft 23 is disposed coaxially of the evaporator bore and has a driven connection with the gear reduction means. Water is prevented from entering the drive housing 22 by seal means including a shaft seal 24 engaging the shaft 23.

The harvesting auger 17 includes a central hub portion 26 having a throughbore. A threaded portion 27 of the bore receives an upper threaded end portion 28 of the shaft 23 to support the harvesting auger 17 for corotation with the driven shaft 23. A somewhat cylindrical or slightly conical portion 29 formed on the harvesting auger 17 and spaced concentrically inwardly of the refrigerated, freezing surface 14 has an outer diameter relatively larger than a diameter of the shaft 23 and carries the helically extending flights or blades 16, which have edges 30 closely spaced adjacent the surface 14 to harvest the thin film of ice as the harvesting auger 17 rotates relative to the surface 14.

The collection chamber 18 is formed by a generally circular or inverted cup-shaped cap means generally indicated at 31 and having one or more channels 32 receiving the ice flake product from the harvesting auger 17. Each of the channels 32 extends in a generally spiral path of increasing cross section for conducting the flake ice product discharged from the evaporator unit 11 upwardly into a central passageway 33 leading into an internal bore 34 of a compression and forming nozzle 35. The nozzle 35 has a generally outwardly extending flange 36 secured to the cap means 31 by suitable fasteners, such as nut and bolt assemblies as at 37 and the cap means 31 are suitably secured by a plurality of circumferentially spaced bolts 38 to a radially outwardly extending flange 39 on the evaporator unit. Thus, the drive housing 22, the evaporator 11, the cap means 31 and the compression nozzle 35 are detachably secured in a stacked relationship by the fastening means 19, 37 and 38.

In order to compress the flake ice product harvested from the refrigerated freezing surface 14 into a solid ice product, a compression auger 41 mounted for corotation with the harvesting auger 17 receives the flake ice product from the collection chamber 18 and squeezes the ice particles through the nozzle bore 34 to remove excess water and form an emergent solid column of ice at an upper end 42 of the nozzle 35. The compression auger 41 has a depending, threaded stud 43 engaged into the threaded bore 27 of the harvesting auger.

If desired, appropriately configured extrusion means may be attached to an outwardly extending flange 44 at the upper end 42 of the nozzle 35 for forming the emerging, solid column of ice into a desired configuration. The extrusion means may be designed to transversely shear the emerging column of ice into ice cubes or otherwise shape the column into desired configurations, for example, chipped ice, shaved ice, cracked ice or small ice cubes.

In accordance with the principles of the present invention, a water supply system, as illustrated in FIG. 2 and generally indicated at 50, gravitationally feeds water through the evaporator inlet conduit 15 and upwardly through a freezing chamber formed by the cylindrical, refrigerated wall 12. The water supply system 50 supplies water to the evaporator 12 in an amount in excess of the freezing capacity of the ice maker and in excess of a quantity required to produce the solid ice column emerging from the upper end 42 of the nozzle 35. Thus, a portion of the inlet or supply water freezes in the evaporator, while another portion of the inlet water is maintained in a liquid or unfrozen state.

When a stream of water freezes, suspended impurities and minerals migrate from the freezing portion of the stream and remain in solution in the liquid or unfrozen portion of the stream. Thus, by gravitationally feeding water in excess of freezing capacity and in excess of the amount required for ice production, the film of ice, which forms on the freezing surface 11 is broken into particles or flakes by the harvesting auger 16 and is substantially free of impurities, thereby providing ice flakes, ice particles or ice slush from which a substantially impurity-free finished product may be produced.

It is contemplated by the present invention to provide means for discarding the impurity-laden, unfrozen or liquid portion of the inlet water. Such means include an outlet conduit 51 connected to a drain and having a drain passageway 52 communicating with an outlet port 53 which intersects the nozzle bore 34. Excess water compressed from the ice flakes or slush forced through the tapered nozzle bore 34 by the compression auger 41 also drains from the nozzle 35 via the outlet port 53 and outlet conduit 51.

With the ice making apparatus 10 of the present invention, the unfrozen or liquid portion of the inlet water discharged through the outlet conduit 51 has a hardness approximately twenty five (25) times that of the inlet or supply water introduced into the evaporator inlet conduit 15. For example, with one structure constructed in accordance with this disclosure the hardness measured at the inlet 15 was 25 grains whereas at the outlet 51 the hardness was measured at 125 grains.

Ice cubes and cracked ice for use with beverages should be clear and substantially tasteless, and minerals or other suspended impurities in water from which ice is formed oftentimes produce a cloudy or unclear ice cube and affect the taste of the ice. Thus, the substantially impurity-free ice product produced by the ice maker 10 of the present invention is particularly adapted for use in the cooling of beverages.

In order to gravitationally feed the inlet water to the inlet conduit 15 and upwardly through the evaporator unit 11, the collection chamber 18 formed by the channels 32 and the nozzle bore 34, the water system 50 includes a tank 57 for containing a pool or reservoir of domestic water having a liquid level 58 maintained at a height above the outlet conduit 51. Conduit means 59 form a passageway 61 communicating an outlet port 62 of the tank 57 with an inlet port 63 formed in the evaporator wall 12 at a lower end portion thereof. The tank outlet port 62, the passageway 61 and the evaporator inlet port 63 are each sized relative to the height of the liquid level 58 maintained in the tank 57 to provide gravity flow through the evaporator freezing chamber in the desired quantity, which is in excess of an amount required for producing the finished ice product.

An overflow outlet port 64 communicates with an overflow drain pipe 65 and is disposed slightly above the desired liquid level, thereby draining excess water from the tank 57 for preventing the liquid level 58 from exceeding the desired height.

Water from a domestic supply source is supplied to the tank 57 via a selectively operable valve means 66 supplying water to the tank in response to receiving a signal indicating a demand for the finished ice product. As illustrated in the drawings, the valve means 66 include a solenoid operated valve having flow-control means. The flow-control means may include a flow-control washer for supplying a constant flow of water to the tank 57, irrespective of a pressure of the supply source. Sensing means 67 in a storage bin 68 receiving the finished ice product sense a level of the finished product within the bin and control operation of the valve means 66 in response to the sensed level. The storage bin 68 receives the finished ice product from the nozzle 35 via an appropriate conduit 69 which may include means for working the emergent column of solid ice into ice cubes or cracked ice.

The sensing means 67 may include temperature sensors disposed at desired maximum and minimum levels of the finished ice product within the storage bin 68 for operating the solenoid valve 66 through the leads 71 whenever the level of finished product reaches the desired minimum level. When water is supplied to the tank 57 ice is produced and directed via the conduit 69 to the storage bin 68. As the produced ice product accumulates in the storage bin 68 and reaches the desired maximum level, the sensing means 67 deactuate the solenoid valve means 66 to stop the flow of domestic water to the tank 57. Operation of the motor M driving the harvesting auger 17 and the compression auger 41 may also be controlled by the sensing means 67.

Also, in accordance with the principles of the present invention, the harvesting auger 17 includes a top wall 71 extending radially outwardly of the central hub 26 and having the cylindrical wall 29 depending from an outer margin 72 thereof. A plurality of radially extending fins or struts 73 extend between the hub 26 and the outer cylindrical wall 29 to reinforce the outer wall.

The harvesting auger cylindrical wall 29 divides the bore or freezing chamber formed by the evaporator wall 12 into an annular region 74 and a central region 76. A plurality of apertures 77 extending through the auger top wall 71 form passageways communicating the central region 76 with the collection chamber 18, and the annular region 74 directly communicates with the channels 32 forming the collection chamber. A top wall 79 of the motor housing 22 closes a lower end of the evaporator 11, and a lowermost, terminal end 79 of the harvesting auger outer cylindrical wall 29 is spaced above the housing top wall, thereby providing a flow passageway 81 admitting the supply of inlet water into the freezing chamber central region 76.

Thus, the supply or inlet water entering through the evaporator inlet port 62 flows into both the annular region 74 and the central region 76. A portion of the supply water flowing through the annular region 74 freezes on the refrigerated freezing surface 14 to form a film of ice which is broken into flakes or particles by the auger flights 16 as the auger 17 rotates within the evaporator 11. The ice flakes and particles broken from the freezing surface 14 and the unfrozen portion of the supply water in the annular region 74 are axially advanced into the collection chamber 18 by the rotating auger flakes 16. The upward flow of the inlet water gravitationally fed to the evaporator 11 assists the rotating flakes 17 to lift or axially advance the ice particles and flakes through the evaporator and into the collection chamber 18. Also, supply water from the central portion 74 flows into the collection chamber 18 through the passageways 77 and mixes with the frozen and unfrozen portions of the inlet water received from the annular region 74.

In the event the ice-making apparatus 10 becomes ice bound by an accumulation of packed ice particles in the evaporator annular region 74, the collection chamber 18 or the nozzle throughbore 34, the apparatus must be shut down to prevent overloading the motor M and to permit the accumulated ice to melt or thaw.

In order to decrease the time necessary to melt the accumulated ice, the water supply system 50 of the present invention includes selectively operable heating means 83 disposed in the tank 57 for heating the inlet water. Control means 84 interconnected by leads 86 to the heating means 83 include a safety thermostat, or other appropriate means, for sensing when the ice making apparatus 10 becomes ice bound. During normal operation of the ice-making apparatus 10, the heating means 83 are inactive, and when the control means 84 sense that the ice making apparatus has become ice bound, the heating means are operated to heat the water supplied to the evaporator inlet port 63. The passageways 77 formed in the auger top wall 71 and communicating the central region 76 with the collection chamber 18 assure flow of the heated inlet water through the evaporator unit 11 even though the outer annular region 74 of the evaporator may be clogged with accumulated ice particles. In such a manner, flow of the heated water to the collection chamber 18 and nozzle throughbore 34 is assured even though the annular region 74 may be blocked, and thawing of the accumulated ice in the annular region is implemented by introducing heated water at both an upper end and a lower end of the annular region.

If desired, the solid column of hard ice emerging from the upper end 42 of the nozzle 35 may be cracked, thereby to provide a finished cracked ice product. In this regard, the present invention contemplates providing cracking means, as illustrated in FIGS. 3 through 5, inclusive, and generally indicated at 90.

The cracking means 90 include a knife blade 91 supported in a holder 92 and having a depending knife or cutting edge 93 extending transversely across the nozzle throughbore 34. As the solid column of ice emerges from the nozzle 35, the column impacts against the knife edge 93 and is split or cracked, thereby forming a cracked ice product which may be utilized for cooling beverages or for other uses. The knife blade 91 includes an upstanding, plate-form body portion 94 having oppositely projecting, lowermost marginal edge portions 96,96 tapered downwardly and inwardly to form the knife edge 93. A pair of oppositely extending tabs 97,97 project laterally outwardly of the upstanding knife body 94 and overlap peripheral margin 98 of the nozzle bore 34.

The knife blade holder 92 includes a sheet-form member having a holding portion 99 and a laterally outwardly extending attachment flange 101. The holding portion 99 has a closed geometrical shape in transverse cross section and may be formed complementally to a configuration of the nozzle bore 34. A pair of diametrically opposed slots 102,102 formed in the holding portion 99 receive the knife blade tabs 97,97 in a manner to retain the knife blade 91 in a fixed position above the nozzle bore 34. A plurality of fastening means, such as bolts as at 103, pass through an equal number of spaced apertures 104 in the holder attachment flange 101 and engage tapped, aligned holes 105 in the nozzle attachment flange 44, thereby to detachably fasten the cracking means 90 in firm assembly with the nozzle 35. If desired, a sealing gasket as at 106 may be interposed between the flanges 101 and 44.

The shape of the knife edge 93 and its inclination axially of the nozzle through 34 may be varied to provide different types of shapes of cracked or chipped ice. One form of the knife blade 91, as illustrated in FIG. 3, has a knife edge 93 inclined axially of the nozzle bore 34 and extending in a continuous line transversely across the nozzle bore.

As illustrated in FIG. 5, another form of the present invention contemplates forming the knife blade 91' with the cutting edge 93' including a pair of oppositely extending portions 108 and 109. The oppositely extending portions 108 and 109 are inclined axially of the nozzle bore 34 and extend laterally outwardly from a common point 111 disposed substantially coaxially of the nozzle bore.

Although those versed in the art may suggest various minor modifications, it should be understood that I wish to embody within the scope of the patent warranted hereon all such modifications as reasonably and properly come within the scope of my contribution to the art.

The embodiments of the invention in which an exclusive property or privilege is claimed are defined as follows:

1. A method of producing a clear, substantially impurity free ice product comprising the steps of:
   feeding water through a freezing zone in an amount in excess of the freezing capacity of the zone and in excess of that required to produce the ice product and freezing a portion of the water fed through the zone while maintaining another portion in a liquid state, whereby impurities migrate from the frozen portion to the liquid portion;
   collecting the frozen and the liquid portions of the water fed through the freezing zone;
   compressing the collected frozen portion to remove excess liquid and to form a compressed ice product; and continuously draining and discarding the excess, impurity-laden liquid state portion of the feed water along with the excess water removed to form the compressed ice product in a manner to prevent the reintroduction of impurities into the water fed through the freezing zone,
   said compressing step including driving the collected water, including the frozen and the liquid portions, in a stream through a tapered nozzle; and
   said discarding step including draining the liquid portion from the driven stream at a point slightly beyond and entrance end in the tapered nozzle.

2. The method as defined in claim 1 and further characterized by:
   said step of feeding includes supplying water from a level higher than the level at which the liquid portion is drained from the tapered nozzle, thereby gravitationally feeding the water through the freezing zone in the form of a stream.

3. A method of producing a clear substantially impurity free ice product comprising the steps of:
   gravitationally feeding water through a freezing zone in an amount in excess of the freezing capacity of the zone and in excess of that required to produce the ice product and freezing a portion of the water fed through the zone while maintaining another portion in a liquid state, whereby impurities migrate from the frozen portion to the liquid portion;
   heating the water fed through the freezing zone whenever an accumulation of the frozen portion of the water blocks free flow of water through the freezing zone, thereby melting the accumulated frozen portion to unblock the freezing zone;
   collecting the frozen and the liquid portions of the water fed through the freezing zones;
   compressing the collected frozen portions to remove liquid and to form a compressed ice product; and
   discarding the excess, impurity-laden water in the liquid state.

4. In an ice-maker,
means including an upright, internal, cylindrical, refrigerated wall surface forming a freezing chamber;
auger means rotatable within said freezing chamber and including a top wall and a depending, cylindrical wall, radially spaced inwardly of said refrigerated wall and carrying helical flights on a periphery thereof and in closely spaced relationship to said refrigerated wall surface,
water supply means feeding water into a lower end of said freezing chamber and upwardly therethrough in a quantity in excess of an amount required for forming an ice product and in excess of the freezing capacity of the freezing chamber, whereby a portion of the water freezes on said refrigerated wall and is harvested by said auger means while another portion of the water remains in a liquid state to receive impurities rejected from the frozen portion;
means forming a collection chamber extending across an upper end of said freezing chamber and receiving the frozen portion and the liquid portion of the water and for mechanically transferring the same to a compression zone,
nozzle means having a tapered throughbore communicating with said collection chamber and extending upwardly therefrom for receiving the collected frozen and liquid portions and for compressing the frozen portion into a compressed ice product,
drain means including an outlet intersecting said nozzle throughbore and continuously directing the impurity-laden liquid portion of the water received from said collection chamber and excess water compressed from the frozen portion to a point of disposal,
whereby impurities in the water fed into said freezing chamber migrate from the frozen portion to the liquid portion and are discarded therewith so that the frozen portion forming the compressed ice product is substantially impurity free and the impurities are disposed of to prevent their reintroduction into the water supplied to the freezing chamber.

5. An ice maker as defined in claim 4 and further characterized by:
said water supply means comprising means forming a pool of water;
conduit means communicating said pool with said freezing chamber; and
means maintaining liquid level of said pool at a height above a disposition of said drain means outlet passageway, thereby to gravitationally feed water into and through said freezing chamber.

6. In an ice-maker,
means including an upright, internal, cylindrical, refrigerated wall surface forming a freezing chamber;
auger means rotatable within said freezing chamber and including a top wall and a depending, cylindrical wall, radially spaced inwardly of said refrigerated wall and carrying helical flights on a periphery thereof and in closely spaced relationship to said refrigerated wall surface,
said auger dividing said freezing chamber into an annular region between said refrigerated wall and said auger cylindrical wall and a central portion extending through said chamber internally of said auger cylindrical wall;
water supply means gravitationally feeding water into a lower end of said freezing chamber and upwardly therethrough in a quantity in excess of an amount required for forming an ice product and in excess of the freezing capacity of the freezing chamber, whereby a portion of the water freezes on said refrigerated wall and is harvested by said auger means while another portion of the water remains in a liquid state;
selectively operable valve means controlling the supply of water to said freezing chamber and supplying a constant volume flow when operated;
means forming a collection chamber extending across an upper end of said freezing chamber and receiving the frozen portion and the liquid portion of the water,
nozzle means having a tapered throughbore for compressing the frozen portion into a compressed ice product,
means forming a storage bin receiving the compressed ice product from said nozzle bore;
control means sensing presence of the ice product in said storage bin and operating said valve to supply water to said freezing chamber whenever accumulated product in said bin is below a certain level;
drain means including an outlet intersecting said nozzle throughbore and directing the liquid portion of the water received from said collection chamber and an excess water compressed from the frozen portion to a point of disposal,
whereby impurities in the water gravitationally fed into said freezing chamber migrate from the frozen portion to the liquid portion and are discarded therewith so that the frozen portion forming the compressed ice product is substantially impurity free.

7. In an ice-maker,
means including an upright, internal, cylindrical, refrigerated wall surface forming a freezing chamber;
auger means rotatable within said freezing chamber and including a top wall and a depending, cylindrical wall, radially spaced inwardly of said refrigerated wall and carrying helical flights on a periphery thereof and in closely spaced relationship to said refrigerated wall surface,
said auger dividing said freezing chamber into an annular region between said refrigerated wall and said auger cylindrical wall and a central portion extending through said chamber internally of said auger cylindrical wall;
water supply means gravitationally feeding water into a lower end of said freezing chamber and upwardly therethrough in a quantity in excess of an amount required for forming an ice product and in excess of the freezing capacity of the freezing chamber, whereby a portion of the water freezes on said refrigerated wall and is harvested by said auger means while another portion of the water remains in a liquid state;
means forming a collection chamber extending across an upper end of said freezing chamber and receiving the frozen portion and the liquid portion of the water,
nozzle means having a tapered throughbore fro compressing the frozen portion into a compressed ice product,
selectively operable heating means in said water supply means for heating water supplied to said freezing chamber when operated;
control means sensing presence of accumulated, frozen water in said freezing chamber, said collection chamber and said nozzle bore and operating said heating means whenever the accumulation of frozen water prevents free flow through said freezing chamber, thereby reducing the time required to thaw the ice maker when the same becomes ice bound;
drain means including an outlet intersecting said nozzle throughbore and directing the liquid portion of the water received from said collection chamber and an excess water compressed from the frozen portion to a point of disposal,
whereby impurities in the water gravitationally fed into said freezing chamber migrate from the frozen portion to the liquid portion and are discarded therewith so that the frozen portion forming the compressed ice product is substantially impurity free.

8. The method of making cracked ice which includes the steps of:
gravitationally feeding water through a freezing zone in an amount in excess of the freezing capacity of the zone and in excess of that required to produce the ice product and freezing a portion of the water fed through the zone into a thin film of ice while maintaining another portion in a liquid state, whereby impurities migrate from the frozen portion to the liquid portion;
removing the thin film of ice from the freezing zone and advancing the removed ice axially in an upward direction by augering the thin film of ice;

replenishing the supply of water from a source to provide water to be frozen into ice and to assist in moving the ice upwardly by flotation forces;

collecting the ice and transferring the collected ice from the freezing zone to a compression zone above the level of the refrigerated surface and radially inwardly thereof;

compressing the ice to remove excess water therefrom by augering the ice upwardly and driving it through a tapered nozzle in the compression zone so that the ice emerges from said compression zone in a compacted dehydrated column of hard ice, draining the excess impurity-laden water from said compression zone to remove impurities from the water supply; and impacting the emerging hard ice column against the cutting edge of a knife supported at the exit of the compression zone transversely across the flow path of the column of ice to shatter the ice column into hard cracked ice chips of irregular size and shape.

9. The method of making hard ice bodies of a desired size and shape which includes the steps of:

gravitationally feeding water through a freezing zone in an amount in excess of the freezing capacity of the zone and in excess of that required to produce the ice product and freezing a portion of the water fed through the zone into a thin film of ice while maintaining another portion in a liquid state, whereby impurities migrate from the frozen portion to the liquid portion;

removing the thin film of ice from the freezing zone and advancing the removed ice axially in an upward direction by augering the thin film of ice;

replenishing the supply of water from a source to provide water to be frozen into ice and to assist in moving the ice upwardly by flotation forces;

collecting the ice and transferring the collected ice from the freezing zone to a compression zone above the level of the refrigerated surface and radially inwardly thereof, compressing the ice to remove excess water therefrom by augering the ice upwardly and driving it through a tapered nozzle in the compression zone so that the ice emerges from said compression zone in a compacted dehydrated column of hard ice, draining the excess impurity-laden water form said compression zone to remove impurities from the water supply; and breaking the emerging hard column of ice into ice bodies of a desired size and shape by impacting the emerging ice column against a breaker member disposed at the exit of the compression zone.

* * * * *